United States Patent [19]
Batterton

[11] Patent Number: 5,709,164
[45] Date of Patent: Jan. 20, 1998

[54] POST-N-PERCH

[76] Inventor: Wade Thomas Batterton, 14 Dreher Ave., Pikesville, Md. 21208

[21] Appl. No.: 413,368

[22] Filed: Mar. 30, 1995

[51] Int. Cl.⁶ .................................................. A01K 29/00
[52] U.S. Cl. ............................................................. 119/28.5
[58] Field of Search ........................... 119/28.5, 531, 119/532, 537, 428, 429, 431, 459, 461, 467, 468, 474, 491

[56] References Cited

U.S. PATENT DOCUMENTS

| | | | |
|---|---|---|---|
| 3,810,445 | 5/1974 | Stadler | 119/531 |
| 3,857,365 | 12/1974 | Mueller | 119/531 |
| 4,057,031 | 11/1977 | Williams et al. | 119/28.5 |
| 5,161,484 | 11/1992 | Duane | 119/26.5 |
| 5,381,758 | 1/1995 | Simon | 119/537 |

*Primary Examiner*—Thomas Price
*Attorney, Agent, or Firm*—LaPrade & Associates

[57] ABSTRACT

The invention comprises a perch for a pet, usually a cat or ferret, made up of a shelf-like member with attached tabs that connect by gravity under a window sash and an adjustable, telescoping, support column below the shelf-like member to allow the shelf to be adjusted and stabilized to the proper height to allow the bottom edge of the shelf-like perch to rest on a conventional window sill. All of the exterior parts are covered with a fabric or constructed of a material such that the pet is encouraged to scratch on the device and, thus, discouraged from scratching on the humans' furniture.

5 Claims, 3 Drawing Sheets

POST-N-PERCH

BACKGROUND OF THE INVENTION

This invention relates to pet appliances, and more particularly to a pet perch with a dependent supporting post and also serves as a scratching post.

DESCRIPTION OF THE PRIOR ART

U.S. Pat. No. 5,351,648 issued to Elkstr for a pet perch for attachment to a window sill in U.S. Class 119/28.5 shows a mechanical bracket member for attachment to the wall below the perch.

U.S. Pat. No. 5,213,060 issued in class 119/82 for a pet ramp that shows the necessity to elevate a pet to a window ledge or upper area.

U.S. Pat. No. 3,857,365 issued to Mueller for a pet platform that is window mounted issued in U.S. class 119/1.

U.S. Pat. No. 3,479,991 issued to Lichtenberger for an animal climbing structure issued on Nov. 25, 1969.

POST-N-PERCH REFERENCE LIST

Perch-10
Post-11
Outer Sleeve-12
Window Tabs-13
Window Sill-14
Port-15
Turn Screw-16
Window Sash-20
Inside Wall-30
Floor-40

Figure 1:
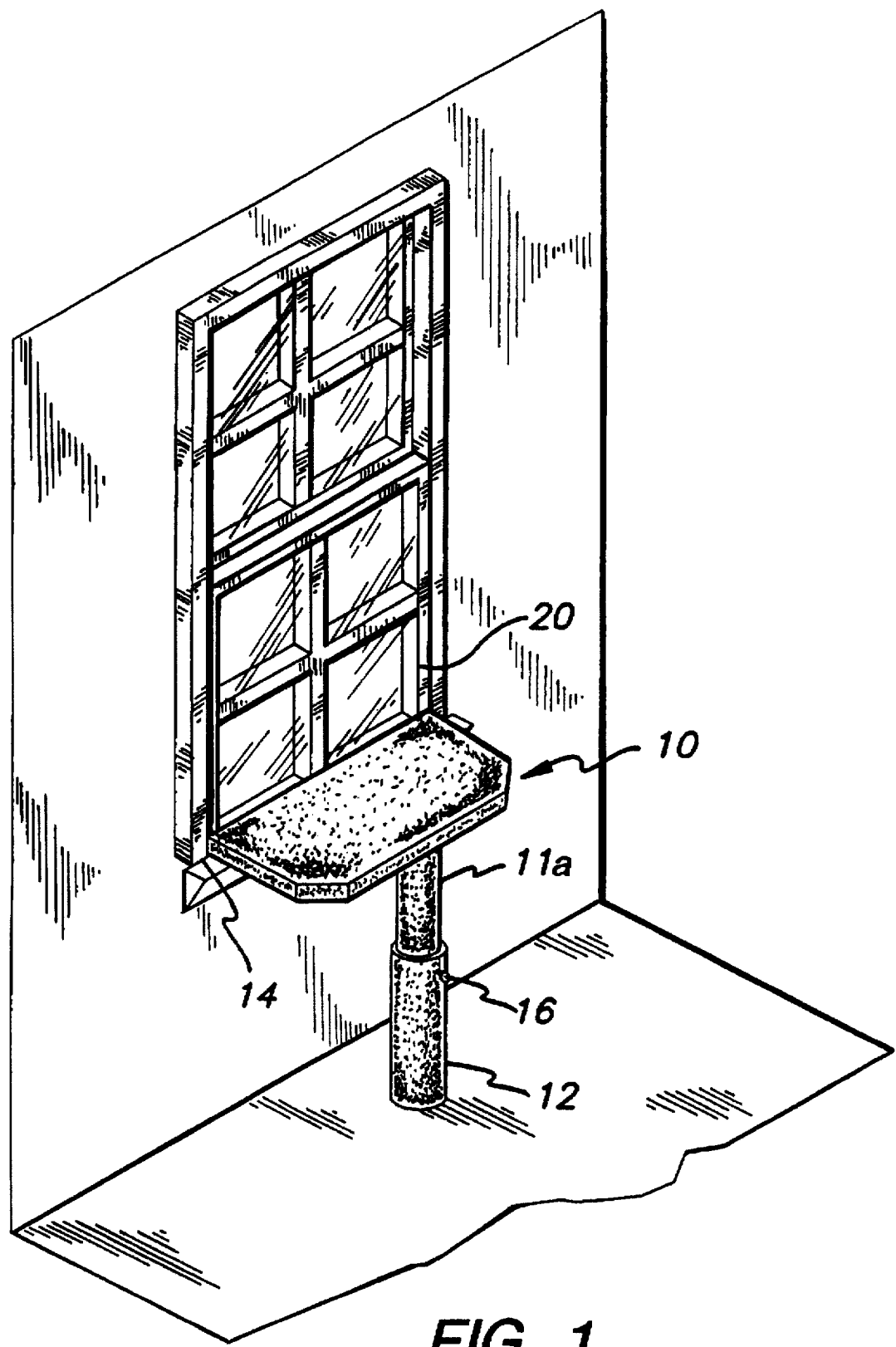
FIG. 1 is a perspective view of the Post-N-Perch mounted on a window ledge.
Figure 2:
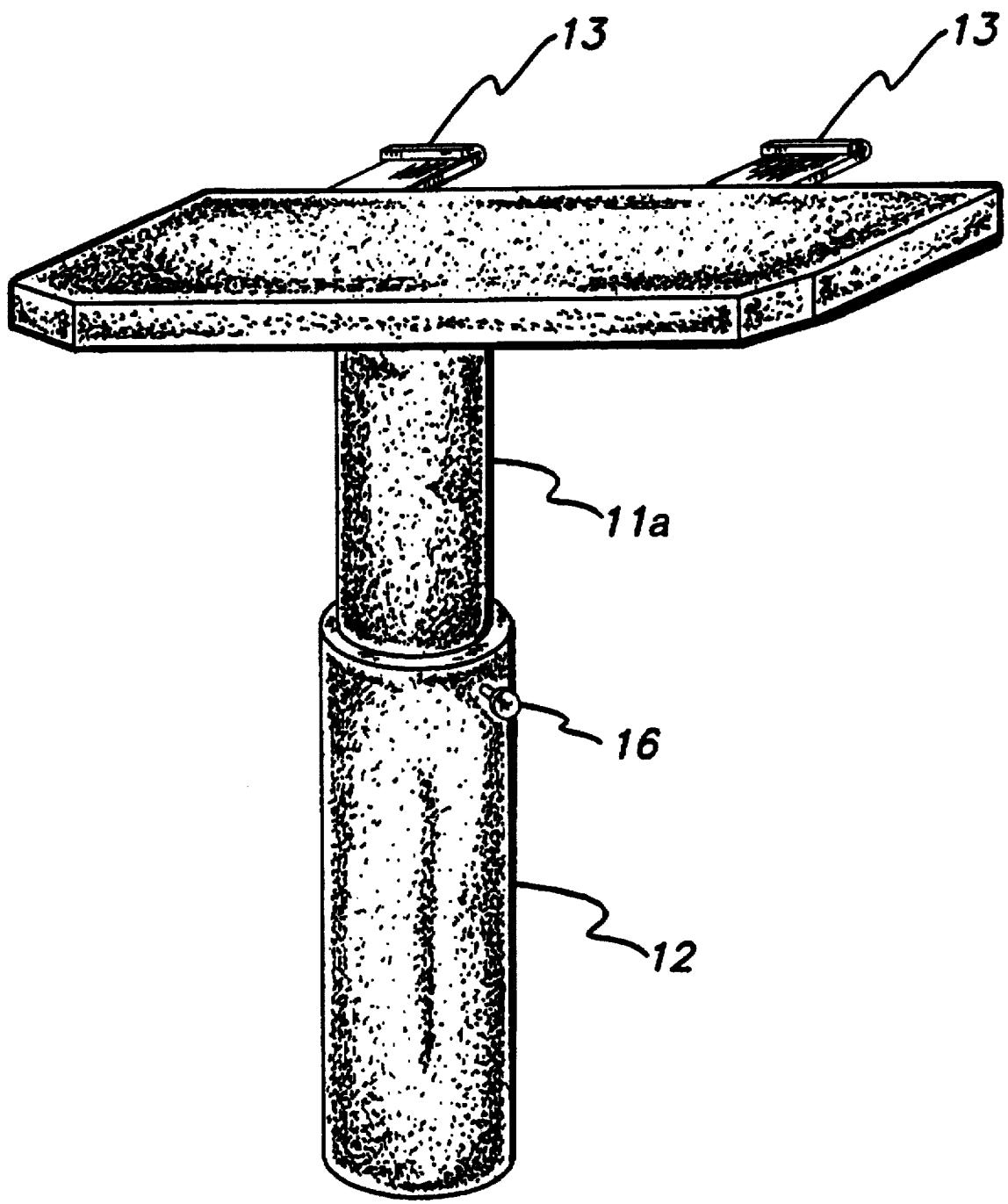
FIG. 2 is another perspective view of the invention.

The view in FIG. 1 shows the invention mounted on a window ledge. It is a combination of a post (11) that can when covered with carpet or carpet like material or fabric, serves as a scratching post in combination with a perch (10) where a pet (such as a cat, ferret, or bird) can sit and look out of a window. The Adjustable post allows the perch to be modified a varying distance from the floor.

The perch (10) is a shelf-like surface of convenient size and material, such as a 10" by 30" surface to fit into a 32" window well, or any custom-order size. The perch shelf may be flat or concave. The perch is fitted with two or more tabs (13) that are secured to the perch and fit under a window sash (20) best shown in FIG. 3.

The perch (10) is usually flat, but may be concave. The post and extended outer sleeve (12) are cylindrical with hollow cores (15). These cylinders will usually have a wall thickness of 1/16" to 1/2" in thickness.

The window tabs (13) may be made of cotton duck or a nylon material or a flexible plastic. The tabs would usually be 1" to 3" wide and they are fastened to the edge of the perch by glue, screws, nails or other conventional fasteners.

A groove (not shown) facilitate the mounting of a thin wall cylindrical post (11) to the base (10B) of the perch (10).

The post, that comprises an inner cylinder (11) and outer sleeve (12) are thin wall cylinders made most conveniently of a paper or plastic material, but could also be made of wood or metal.

The exposed surfaces of the perch, inner post or cylinder (11) and its sleeve (12) may be covered with sisal, a bulky carpet such as berber or shag, made of nylon or polypropelyne or any economical carpet or fabric. Any part of the exposed surface of perch (10) or post (11) could be wood, smooth, textured, or natural bark and any other part could be made of a different material.

Figure 3:
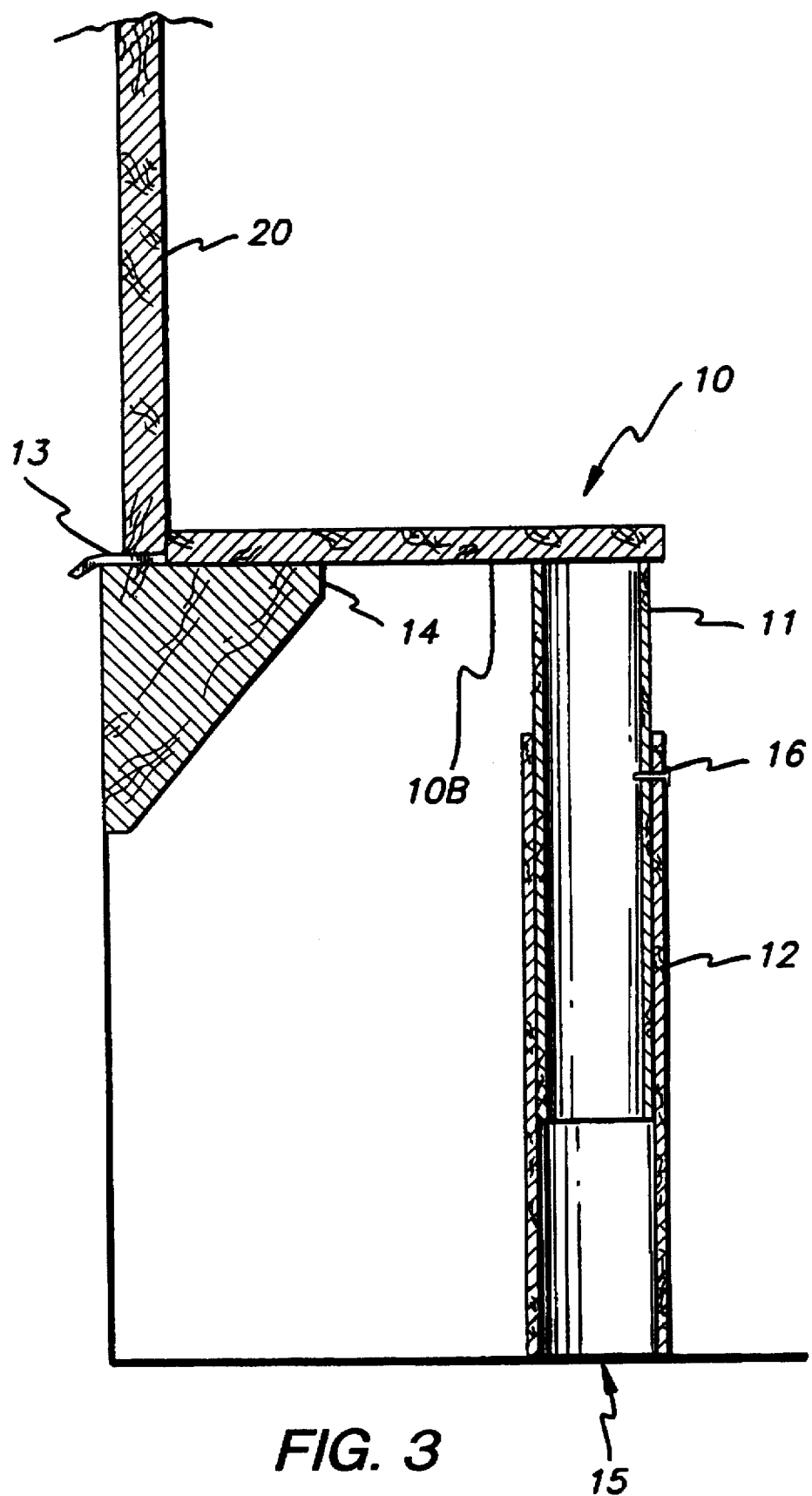
FIG. 3 is a cut-away cross-sectional view of the invention mounted on a conventional window sill.

The carpet covering (11a) on post (11) may form a very tight fit inside sleeve (12) so that when sleeve 12 is extended to make contact with the floor very little pressure is put on the pin or screw (16) Multiple pins or screws (16) may be used to secure post (11) to extended sleeve (12) as shown in FIG. 3.

The window tabs (13) that may be two or more tabs glued, nailed, or stapled to the bottom or side edge of perch member (10) extend under a sash window as shown in FIG. 3. FIG. 3 shows the brace and window ledge structure (14) in cross section.

The post or cylinder (11) and extended sleeve (12) may be of almost equal lengths, and each may vary in length, usually from about 24" to 30" to fit a window height from 24" to 58" inches from the floor. A much larger or higher perch would require two or more posts, determined from custom-ordered dimensions.

The post and the depending outer sleeve may be made of cardboard, plastic, aluminum tubing, or even wood. The shelf-like member (flat or concave) may be made of any material and is usually best covered with heavy fabric or carpet-like fabric.

The foregoing description has been given for clarity of understanding. No unnecessary limitation should be inferred from the description as modification may be made by one of ordinary skill in the art.

In FIG. 3, the part (15) represents an opening in the base of cylinder (12)

Invention: Post-N-Perch

I claim:

1. A pet perch comprising an essentially flat shelf-like member with a pair of connector means that functions to connect the shelf to the window sash, each protruding from one side of the shelf, that are engaged by the closure of a window sash to hold the shelf-like member in a horizontal position and combination support post member comprising an adjustable support post connected to the bottom of the shelf-like member to support the shelf-like member at a predetermined height above the floor and in an essentially horizontal position at a window ledge, wherein the support post is comprised of a concentric cylinder, combined with an outer sleeve member surrounding the cylindrical support post member and where the outer sleeve member is slidable with respect to the support post member so as to touch the floor and support the perch, and where the shelf-like member has at least one pair of connector webs extending from one surface of the shelf and can be extended under a window sash for purpose of stability, and where the post cylinder and extended outer sleeve cylinder are covered with a carpet-like or textured material so that there a a frictional fit between the two cylinders.

2. The pet perch of claim 1, wherein the post and cylindrical outer sleeve member are secured together at a desired height by a screw mechanism.

3. The pet perch of claim 1, wherein the post and sleeve member are concentric cylinders, one cylinder being partly housed within the other cylinder and means to secure the two cylinders in a locked position (7) at a given height.

4. The pet perch of claim 1, wherein the connector means extending from one side are fabric tabs that engage a conventional window sash.

5. The pet perch of claim 1, where the outer sleeve member is fitted with screw means, where the screw means functions to secure the outer sleeve to the support post in a fixed position.

* * * * *